United States Patent

Kato et al.

[11] Patent Number: 5,989,466
[45] Date of Patent: *Nov. 23, 1999

[54] VARIABLE SECTION EXTRUSION DIE SET AND VARIABLE EXTRUSION MOLDING METHOD

[75] Inventors: Masatsugu Kato; Shigeo Sano, both of Tokyo; Yasumasa Hiyoshi, Susono, all of Japan

[73] Assignee: Mitsubishi Aluminum Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/737,332

[22] PCT Filed: Mar. 14, 1996

[86] PCT No.: PCT/JP96/00647

§ 371 Date: Nov. 14, 1996

§ 102(e) Date: Nov. 14, 1996

[87] PCT Pub. No.: WO96/28264

PCT Pub. Date: Sep. 19, 1996

[30] Foreign Application Priority Data

Mar. 16, 1995 [JP] Japan ................................. 7-083556
Apr. 24, 1995 [JP] Japan ................................. 7-120428
Sep. 4, 1995 [JP] Japan ................................. 7-248295

[51] Int. Cl.⁶ ........................... B29C 47/22; B30C 11/26
[52] U.S. Cl. ........................... 264/40.5; 72/260; 72/265; 264/40.7; 264/167; 264/177.16; 264/209.2; 425/150; 425/381; 425/465; 425/466
[58] Field of Search ................. 264/40.7, 40.5, 264/167, 323, 209.2, 177.16; 425/465, 466, 467, 381, 141, 140, 150; 72/260, 253.1, 264, 265

[56] References Cited

U.S. PATENT DOCUMENTS 2,392,336  1/1946   Nissen ..................................... 425/381
2,715,459  8/1955   Krause ..................................... 72/260
2,748,934  6/1956   Wheeler .
2,778,493  1/1957   Kreidler ................................... 72/468
2,780,835  2/1957   Sherman ................................ 425/466
2,899,053  8/1959   Govan ...................................... 72/260
3,176,494  4/1965   Cullen et al. .......................... 425/381
3,178,770  4/1965   Willis ................................. 264/177.16
3,540,094  11/1970  Janssen ................................. 425/381
3,585,834  6/1971   De Bruyn et al. ....................... 72/260
3,820,374  6/1974   Braeuninger ........................... 425/381
3,914,085  10/1975  Kruelskie ............................... 425/381
4,159,293  6/1979   Fukase et al. ......................... 264/40.7
5,022,252  6/1991   Wellman et al. ......................... 72/260

FOREIGN PATENT DOCUMENTS 925 343   7/1949   Germany .

Primary Examiner—Jan H. Silbaugh
Assistant Examiner—Mark Eashoo
Attorney, Agent, or Firm—Oblon, Spivak, McClelland, Maier & Neustadt, P.C.

[57] ABSTRACT

By using a variable section extrusion die set which includes a die set (24) displaceable in a first direction orthogonal to an extrusion direction of a molding material and in a second direction perpendicular the first direction and adapted to vary an area of an extrusion molding hole (31) through which the molding material is extruded, and a mandrel (27) reciprocally movable in and out of said extrusion molding hole in the extrusion direction and provided on an outer peripheral portion thereof with a tapered portion (27B) which is gradually reduced in outer configurational dimension from one direction of the reciprocally moving direction to the other, said die set being moved to deform the extrusion molding hole (31) while pressing the molding material against said die set (24), and the tapered portion of the mandrel (27) being reciprocally moved in and out of the extrusion molding hole, extrusion molding of a tubular molding is thereby accomplished which varies in outer configurational dimension and inner configurational dimension in a longitudinal direction.

7 Claims, 9 Drawing Sheets

VARIABLE SECTION EXTRUSION DIE SET AND VARIABLE EXTRUSION MOLDING METHOD

TECHNICAL FIELD

This invention relates to a variable section extrusion die set and to a variable cross section extrusion molding method using the die set, both usable when a tubular molded member is formed which varies in outer configurational dimension and inner configurational dimension in its longitudinal direction, in particular, from a molding material such as aluminum.

BACKGROUND ART

Recently, in various types of automotive vehicles such as ordinary automobiles, trucks and the like, component parts such as chassis members, vehicle main-frame members, bumpers and the like, which are made of aluminum or aluminum alloys, have been widely used in place of those which are conventionally made of steel, because the aluminum chassis members, etc., are superior, especially with respect to the light-weight of the vehicle main-frame members, prolonged service life of vehicles, recyclability, etc.

In manufacturing such kinds of vehicle component members, it is an ordinary practice to employ the extrusion technique. The reason for this is that the melting point of aluminum, which serves as a raw material, is low. In such an extrusion technique, an extrusion die set having a hole portion which has a configuration similar in section to those of the vehicle component members is firmly secured to a distal end portion of a container, a billet is inserted into the interior of the container, and then the billet is pressed towards the extrusion die set by a stem so that the billet is extruded out of the hole, thereby appropriately shaping the above-mentioned vehicle component members. According to this extrusion technique, since the hole portion of the extrusion die set has a constant sectional configuration, the vehicle component members thus obtained each has a constant sectional configuration in the longitudinal direction.

Incidentally, these various types of component members use H-shaped and T-shaped members consisting essentially of a web and a flange portion because these shapes offer predetermined amounts of mechanical strength, in other words, high sectional secondary moment. However, the employment of the H-shaped and the T-shaped members necessitates an increased outer configurational dimension in section and the requirement for smaller installation space cannot be met. Moreover, the flange portion sometimes interferes with other attachment members depending on where such H-shaped and T-shaped members are attached. Therefore, research is being conducted regarding the use of a tubular member which is smaller in outer configurational dimension and has superior mechanical strength.

However, in the conventional extrusion die set of the type mentioned above, since its hole portion has a constant sectional configuration, a resultant-molded tubular member also has a constant sectional configuration in the longitudinal direction. In a component member of this type, however, distribution of bending stress to be acted thereon usually varies in the longitudinal direction and the component member is obliged to have larger dimensions and strength than necessary at portions on which no large bending stresses act. Accordingly, molding material is excessively and wastefully used. This is particularly inefficient economically. Moreover, the requirements for the originally intended smaller installation space and light-weight design cannot be met.

As one way to hopefully avoid the above problems, employing an extrusion molding die set of the type as disclosed, for example, in International Publication No. WO93/00183, may be contemplated.

FIGS. 10 and 11 depict a conventional extrusion molding die set disclosed in the above International Publication. This extrusion molding die set is originally designed to extrude a tube having a variable shape and a variable wall thickness and which tube is made of copper. In the illustration, reference numeral 1 denotes a container; 2, a mandrel; 3, a pressure ram; and 4, a billet, respectively. The container 1 is provided at a distal opening portion thereof with a die set 5. The die set 5 is provided with a die section variable device 7. This die section variable device 7 has a hydraulic cylinder 8 for causing a plate-like extrusion member 7 to move in and out of the die set 5.

According to the above extrusion molding die, the hydraulic cylinder 8 of the die section variable device 6 is properly operated to cause the plate-like extrusion member 7 to move in and out of the die set 5 while extruding the billet 4 in the container 1 from the die set 5 with the pressure ram 3, so that a variable section tubular member 10, which has projections 9 on desired areas of an outer peripheral portion, can be formed, as shown in FIG. 11.

However, any attempt to apply of the above conventional extrusion molding die set to the technique for molding various kinds of tubular component members of the types mentioned above encounters problems in that since the projections 9 are formed merely on the area where mechanical strength is required in spite of the inside diameter (inner configurational dimension) being kept constant by the mandrel 2 in the longitudinal direction, the wall thickness of this area becomes larger than necessary due to the provision of the projections 9, and as a result, molding material is wastefully consumed and the requirement for making the component members light in weight cannot be met. Moreover, it gives rise to another problem in that the projections 9 locally formed are obstructive in view of the attachment structure.

The present invention has been accomplished for the purposes of effectively obviating the problems inherent in the conventional extrusion die set and the extrusion molding method using this die set. It is, therefore, an object of the present invention to provide a variable section extrusion die set and a variable section extrusion molding method capable of molding a tubular member which is arbitrarily varied in outer configurational dimension and inner configurational dimension in the longitudinal direction when a molding material such as aluminum is to be extruded.

DISCLOSURE OF INVENTION

A variable section extrusion die set according to the present invention comprises a die set displaceable in a first and a second direction orthogonal to an extrusion direction of a molding material and adapted to vary an area of an extrusion molding hole through which the molding material is extruded, and a mandrel reciprocally movable in and out of the extrusion molding hole in the extrusion direction and provided on an outer peripheral portion thereof with a tapered portion which is gradually reduced in outer configurational dimension from one direction of the reciprocally moving direction to the other.

Here, a second form of the invention is characterized in that the die set comprises a first die movable in the first direction orthogonal to the extrusion direction of the molding material and having an opening portion which is expansible and contractible in the first direction, and a second die located on a downstream side of the first die in the extrusion direction such that the second die can move in the second direction orthogonal to the extrusion direction and perpendicular to the first direction, the second die having an opening portion which is expansible and contractible in the second direction, the mandrel being located within an extrusion molding hole defined by an overlapped portion of the opening portions of the first and second dies such that the mandrel can reciprocally move in the extrusion direction, the mandrel being provided on an outer peripheral portion thereof with a tapered portion which is gradually reduced in outer configurational dimension from one direction of the reciprocally moving direction to the other.

Further, a third form of the invention is characterized in that the first die as defined above comprises a pair of plate-like members whose parallel opposing surfaces can be brought toward and away from each other, the second die comprises a pair of plate-like members whose parallel opposing surfaces can be brought toward and away from a direction orthogonal to the first die, and the mandrel has a prismatic configuration similar to the square extrusion molding hole defined by the overlapped portion of the opening portions of the first and second dies, the mandrel being provided on an outer peripheral portion thereof with a tapered portion whose inter-side surface thickness dimension is gradually reduced from one direction of the reciprocally moving direction to the other.

In addition, a fourth form of the invention is characterized in that the die set as defined in the first form of the invention comprises a pair of dies capable of rotating about axes parallel to each other, the pair of dies being formed with arcuate surfaces which are brought into contact with each other in accordance with the rotational movement of the dies, each of the arcuate surfaces being formed therein with a groove portion extending in a circumferential direction of each arcuate surface and continuously varied in section in the circumferential direction, each of the arcuate surfaces being formed therein with an extrusion molding hole which is closed in section by the groove portion formed in each of the arcuate surfaces.

Here, a fifth form of the invention is characterized in that each of the pair of dies as defined in the fourth form of the invention comprises a circular columnar member or a circularly cylindrical member whose outer peripheral surface is the arcuate surface, the groove portion comprises a semicircular groove portion in section which continuously varies in radius in a circumferential direction of the arcuate surface, the extrusion molding hole has a circular configuration, and the mandrel has a conical surface on an outer periphery thereof.

Next, in a sixth form of the invention a variable section extrusion molding method according to the present invention comprises, by using a variable section extrusion die set comprising a die set displaceable in a first direction orthogonal to an extrusion direction of a molding material and in a second direction perpendicular the first direction and adapted to vary an area of an extrusion molding hole through which the molding material is extruded, and a mandrel reciprocally movable in and out of the extrusion molding hole in the extrusion direction and provided on an outer peripheral portion thereof with a tapered portion which is gradually reduced in outer configurational dimension from one direction of the reciprocally moving direction to the other, the steps of moving the die set to deform the extrusion molding hole while pressing the molding material against the die set, and reciprocally moving the tapered portion of the mandrel in and out of the extrusion molding hole, thereby extrusion molding a tubular molding which varies in outer configurational dimension and inner configurational dimension in a longitudinal direction.

In addition, a seventh form of the invention is characterized in that the die set as defined in the sixth form of the invention comprises a first die movable in the first direction orthogonal to the extrusion direction of the molding material and having an opening portion which is expansible and contractible in the first direction, and a second die located on a downstream side of the first die in the extrusion direction such that the second die can move in the second direction orthogonal to the extrusion direction and perpendicular to the first direction, the second die having an opening portion which is expansible and contractible in the second direction, the mandrel being located within an extrusion molding hole defined by an overlapped portion of the opening portions of the first and second dies such that the mandrel can reciprocally move in the extrusion direction, the mandrel being provided on an outer peripheral portion thereof with a tapered portion which is gradually reduced in outer configurational dimension from one direction of the reciprocally moving direction to the other, opposing surfaces of the first and second dies being brought toward and away from each other to deform a square extrusion molding hole formed by overlapped portions thereof while pressing the molding material against the first and second dies, the tapered portion of the mandrel being reciprocally moved within the extrusion molding hole, thereby extrusion molding a rectangular tubular molding whose square outer and inner peripheries vary in the longitudinal direction.

On the other hand, an eighth form of the invention is characterized in that the die set as defined in the sixth form of the invention includes a pair of dies capable of rotating about axes parallel to each other, the pair of dies being formed with arcuate surfaces which are brought into contact with each other in accordance with the rotational movement of the dies, each of the arcuate surfaces being formed therein with a groove portion extending in a circumferential direction of each arcuate surface and continuously varied in section in the circumferential direction, each of the arcuate surfaces being formed therein with an extrusion molding hole which is closed in section by the groove portion formed in each of the arcuate surfaces, at least one of the pair of dies being rotated to extrude the molding material within the extrusion molding hole while extruding the molding material towards the extrusion molding hole, the tapered portion of the mandrel being reciprocally moved within the extrusion molding hole, thereby extrusion molding a hollow molding which varies in section in a longitudinal direction.

Furthermore, a ninth form of the invention is characterized in that when the invention as defined in one of forms six through eigth is carried out, a factor of variation of the opening area of the extrusion molding hole against the length dimension of the molding member and an extrusion amount of the molding material by the extrusion means are preliminarily set to control means, and the die set and mandrel are driven to control the amount of variation of the opening area by the control means while detecting the amount of movement of the pressure means when extrusion molding is effected, such that a molding will have an extrusion length and an opening area corresponding to the amount of movement.

In addition, a tenth form of the invention is characterized in that, in the invention as defined in one of forms six through nine, the molding material is extruded through the extrusion molding hole formed in the die set and opening in the upward and downward directions, toward the therebelow.

In the invention as defined in the first form and in the invention as defined in sixth form which uses the invention as defined in the first form, the extrusion molding hole formed in the die set is deformed while pressing a molding material against the die set, and the tapered portion of the mandrel is reciprocally moved in the extrusion molding hole. By doing this, the outer periphery of the molding defined by the extrusion molding hole and the inner periphery defined by the tapered portion can be arbitrarily varied. Accordingly, it becomes possible to extrusion mold a tubular molding which easily varies in outer configurational dimension and inner configurational dimension in the longitudinal direction.

In addition, according to the invention as defined in the second form of the invention and the invention as defined in the seventh form which uses the invention as defined in the second form of the invention, while pressing the molding material against the first and second dies, the first and second dies are moved to deform the extrusion molding hole formed by the overlapped portion of their openings and the tapered portion of the mandrel is reciprocally moved in the extrusion molding hole. By doing this, it becomes possible to extrusion mold a tubular molding which easily varies in outer configurational dimension and inner configurational dimension in the longitudinal direction.

At that time, as the invention as defined in the third form of the invention, if the first and second dies are constituted of a pair of plate-like members whose opposing surfaces can be brought toward and away from each other in the orthogonal direction, and if the mandrel formed to have a prismatic configuration similar to the configuration of the square extrusion molding hole which is formed by the opening portions of the first and second dies, with the outer peripheral portion thereof provided with a pyramidal tapered portion whose inter-side surface thickness dimension gradually becomes smaller in the reciprocating direction is used, a tubular molding, which gradually varies in square outer and inner peripheral dimensions in the longitudinal direction, can be extrusion molded.

On the other hand, according to the invention as defined in the fourth form of the invention and the invention as defined in the eighth form of the invention which uses the invention as defined in the fourth form of the invention, while extruding a molding material in the extrusion molding hole formed by the groove portions of the first and second dies, the mandrel is inserted and reciprocally moved in the extrusion molding hole such that the molding material is extruded through a gap between the mandrel and the extrusion molding hole. As a consequence, a hollow molding having various shapes of sections corresponding to the configuration of the extrusion molding hole can be obtained.

In particular, according to the invention as defined in the fifth form of the invention, both the first and second dies are rotated to extrude a molding material into a circular extrusion molding hole formed by the groove portion having a semi-circular shape in section and in that condition, the mandrel having a conical surface is reciprocally moved in the extrusion molding hole. By doing this, a circular tubular molding, which arbitrarily varies in outer diameter and inner diameter in the longitudinal direction, can be extruded.

Furthermore, according to the invention as defined in the ninth form of the invention first, a factor of variation of the opening area of the extrusion molding hole against the length dimension of the molding member and an extrusion amount of the molding material by the extrusion means are preliminarily set to the control means, and while detecting the amount of movement of the pressure means when extrusion molding is effected, the die set and mandrel are controlled in the amount of variation by the variable means such that an extrusion length and an opening area of the molding will become, under the control of the control means, an extrusion amount (volume) of the molding material obtained from the amount of movement with the passage of time. Accordingly, the configuration of the molding against the extrusion length dimension thereof can easily be controlled in line with the extrusion operation of the molding material and without directly measuring the length dimension of the molding. As a consequence, a structural member having a variable section can be extrusion molded with high dimensional accuracy.

Operation of the control means will now be described specifically. First, as shown in FIG. 9, an expression of change $A=f(Z)$ of the opening area $\underline{A}$ against the length Z in the structural member to be molded is obtained. Then, the sectional area D, the expression of change $A=f(z)$ of the opening area $\underline{A}$ against the length z of the molding, and an expression of relation between this expression of change and the control amount of the variable means, that is, between the moving amount of the die set and the moving amount of the mandrel, are preliminarily input to the control means.

Here, the volume of the molding material extruded by dL movement of the ram is $dV=D \cdot dL$. On the other hand, presuming that a molding of a length dZ is extruded from the die hole while the opening area $\underline{A}$ is varied by the dL movement of the ram, the volume of the extruded molding is $dV=f(Z) \cdot dZ$. Thus, the following equation can be established.

$$D \cdot dL = f(Z) \cdot dZ \quad (1)$$

Accordingly, the length $\Delta Z$ of the molding formed when the molding is extruded from $Z_0$ to $Z_1$ in such a manner as to correspond to the $\Delta L$ movement can be expressed by the following equation;

$$D \cdot \Delta L = F(Z_1) - F(Z_0) \quad (2)$$

which equation can be obtained by differentiating both sides of the equation (1) with respect to the respective ranges. It should be noted that $F(Z) = \int f(Z) dZ$. In the equation (2), the equation $A=f(Z)$ and the values of D and $Z_1$ are known. Accordingly, when the extrusion molding is performed, the moving amount $\Delta Z$ of the ram is detected. At the time, when the ram is moved to $\Delta L$ which has been established to the control means, the amount of variation of the opening area is controlled by moving the die set and the mandrel by the variable means such that the molding will have an extrusion length $\Delta Z$ and an area $f(Z_1)$ corresponding to the above-mentioned $\Delta L$ obtained by calculation based on the equation (2), thereby enabling the performance of an extrusion molding of a tubular molding having a predetermined variable sectional configuration.

At that time, if $\Delta L$ is set to a small enough value compared to the rate of variation of the opening area $\underline{A}$, an average value $\{f(Z_1)-f(Z_0)\}/2 = fm$ can be used as the opening area of the extrusion molding die hole. As a consequence, the equation (2) can be rewritten into the following simple style.

$$D \cdot \Delta L = fm \cdot \Delta Z \quad (3)$$

Thus, $\Delta Z = \Delta L \cdot R$ (where $R = D/fm$: ratio of extrusion). Accordingly, by calculating the ratio of extrusion between the specific $\Delta L$, there can be obtained $\Delta Z$ corresponding to $\Delta L$. For this reason, the arithmetic processing by the control means becomes much easier and this is particularly favorable.

If the extrusion molding is effected using a so-called "horizontal-type" extrusion molding apparatus for extruding a molding material in a horizontal direction, it is necessary, in view of the construction of the extrusion molding apparatus, that the holding portion of the variable section extrusion die be supported from the outer periphery side. As a consequence, the support means and a part of the variable section extrusion die set interfere with each other. For this reason, it becomes difficult to install the variable section extrusion die set such that the die set can move in four directions orthogonal to each other. Accordingly, the installation position of the die set is limited. There is also a fear that the configuration of a molding to be manufactured is limited.

In this respect, according to the invention as defined in the tenth form of the invention, the extrusion molding is performed from thereabove to therebelow. Accordingly, the variable section extrusion die set can be supported in its horizontal posture by the support means below which the variable section extrusion die set is installed. Since no support means liable to interfere with the variable section extrusion die set is located on the outer periphery of the die set, the first and second dies can be installed at any arbitrarily selected location. Thus, the degree of freedom for manufacturing a molding can be greatly increased.

Moreover, if the molding material is extruded in the horizontal direction, it is necessary that the outgoing molding be supported by a roller or the like from below. This results in the possibility that a lower surface of the molding may be damaged. In addition, according to the above molding method, since a rectangular tubular member whose outer configurational dimension varies in the longitudinal direction is molded, the level of the lower surface is altered to make it difficult to support the rectangular tubular member. In addition, if the horizontal type extrusion molding apparatus is used, four tie rods for retaining the end platen, to which the die set is secured in its horizontal posture, do not extend uniformly. For this reason, since the die set is inclined in unison with the end platen, the die driving device secured to the floor and the die set are inclined relative to each other. As a consequence, a line of force between the driving device and the die set is offset to necessitate an excessively large slide force. In the worst case, the apparatus is damaged. In this respect, according to the invention as defined in the tenth form of the invention, the variable section extrusion die set and its driving device can be installed on the same end platen. Accordingly, no relative inclination is produced between the variable section extrusion die set and the driving device. Thus, a molding can be extrusion molded with a small sliding force and with high accuracy. Moreover, since the molding can be extruded without contacting a guide or a table, the problem of causing damage to the outer peripheral surface of the molding can be obviated. In addition, since a vertical type molding apparatus is used, the extrusion molding can be performed in a space efficient manner.

BEST MODE FOR CARRYING OUT THE INVENTION

Embodiment 1

Figure 1:
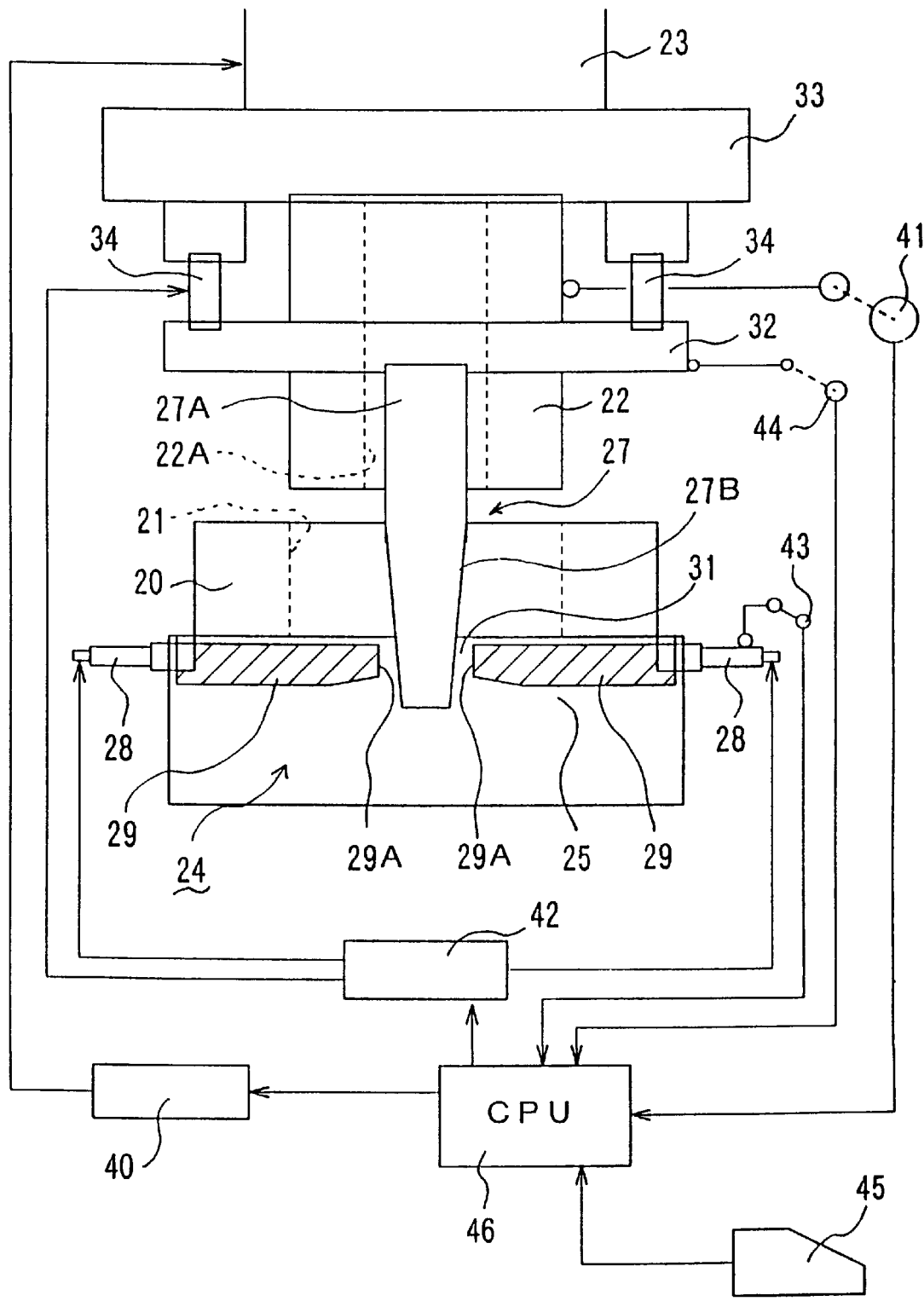
FIG. 1 is an overall front view showing an extrusion molding apparatus incorporated in the first embodiment of a variable section extrusion die set according to the present invention.
Figure 2:
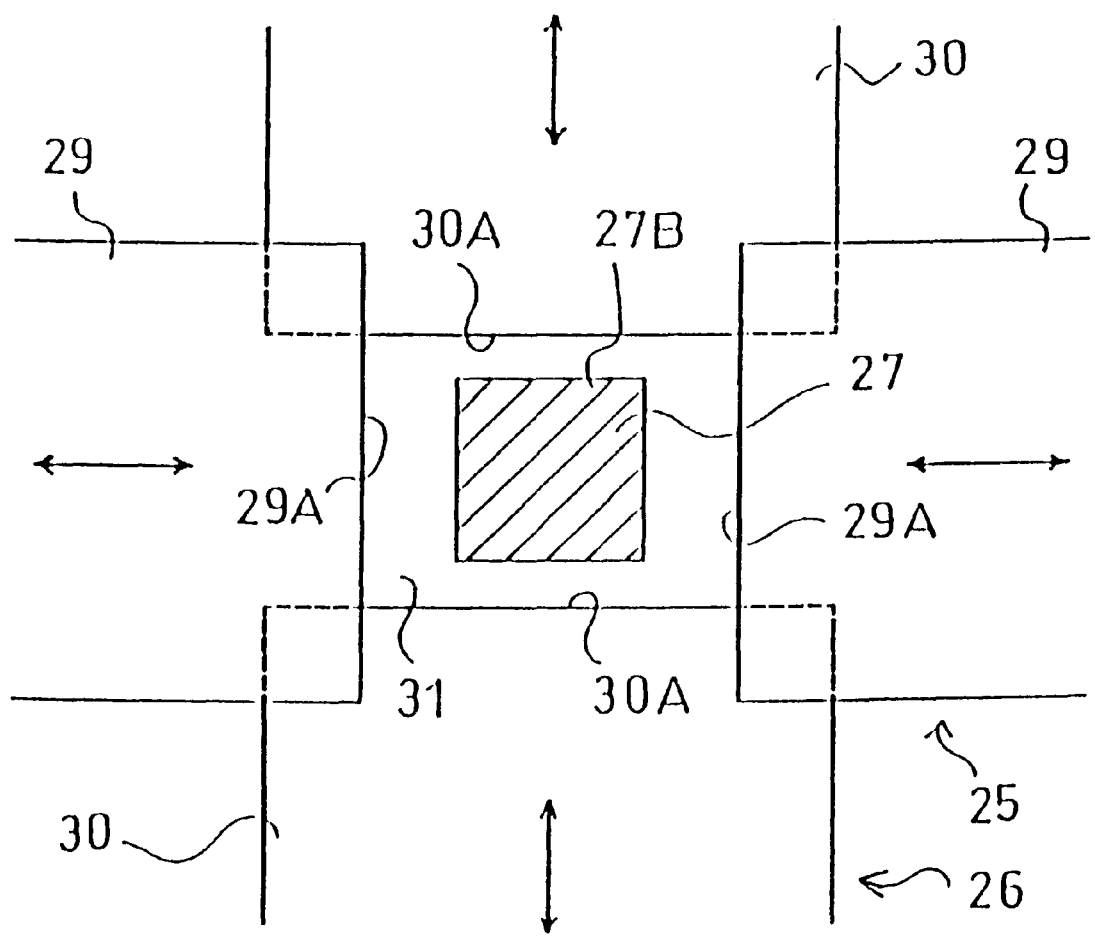
FIG. 2 is a plan view of the variable section extrusion die set portion of FIG. 1.

FIG. 1 is a front view showing an extrusion molding apparatus incorporated with the first embodiment in which a variable cross section extrusion die set according to the present invention is applied to a technique for extruding a rectangular tubular automobile component member from aluminum or aluminum alloy, and FIG. 2 is a plan view of the variable section extrusion molding die set.

In FIG. 1, this extrusion molding apparatus is a so-called "vertical extrusion" molding apparatus for extruding the molding material from thereabove to therebelow. In the illustration, reference numeral 20 denotes a container having a circular column-like aluminum billet receiving hole 21 formed therein. On an upper surface side of the container 20, a hollow stem 22 for extruding a billet within the container 20 is reciprocally movably disposed within the receiving hole 21 by a ram 23. On the other hand, on a downstream side in an extrusion direction of the container 20, a variable section extrusion die set 24 is disposed.

This variable section extrusion die set 24 chiefly comprises a first die 25 and a second die 26 which are arranged in order in the extrusion direction of the molding material, and a mandrel 27 pierced into the receiving hole 21 and extending in the extrusion direction.

Here, as shown in FIGS. 1 and 2, the first die 25 comprises a pair of plate-like members 29 and 29 whose parallel opposing surfaces 29A and 29A are brought toward and away from each other in a leftward and rightward direction in the illustration by driving devices 28 and 28 such as cylinders or the like. On the other hand, the second die 26 comprises a pair of plate-like members 30 and 30 whose parallel opposing surfaces 30A and 30A are brought toward and away from each other in an upward and downward direction (not shown in FIG. 1 because this direction would be out of and into the paper) orthogonal to the plate-like members 29 and 29 of the first die 25.

And, as shown in FIG. 2, an overlapped portion of opening portions between opposing surfaces 29A and 30A of the plate-like members 29 and 30 forms a square-shaped extrusion hole 31 which defines an outer periphery of a molding.

On the other hand, the mandrel 27 is formed such that at least a distal end portion thereof exhibits a square-columnar configuration. This distal end portion is formed with a pyramidal tapered portion 27B gradually reduced in the thickness dimension between its side surfaces towards the distal end side. The mandrel 27 is movably disposed in the extrusion direction with its tapered portion 27B located within the extrusion molding hole 31. A basal end portion 27A of this mandrel 27 is pierced into a through-hole 22A which is formed in the hollow stem 22. The basal end of the mandrel 27 is secured to an attachment plate 32 which is pierced into a groove portion formed in an outer periphery of the hollow stem 22 such that the attachment plate 32 can move in the extrusion direction. Driving devices 34 comprising cylinders for reciprocally moving the mandrel 27 in the extrusion direction of the molding material through the attachment plate 32 are interposed between opposite end portions of the attachment plate 32 and outer peripheries of flange portions 33 of the ram 23.

This extrusion molding apparatus further includes a control system for smoothly performing variable section extrusion molding.

Specifically, the ram 23 of the extrusion molding apparatus is connected with a hydraulic device 40 for driving the ram 23. The ram 23 is further provided with a pulse oscillator (location detector means) 41 for detecting a moving amount dL in the extrusion direction. On the other hand, the driving devices 28 for driving the first die 25 and the second die 26, respectively, and the driving devices 34 for driving the mandrel 27, are connected with a driving source 42 for supplying driving fluid such as hydraulic oil, air pressure or the like to them. The driving source 42 and the driving devices 28 and 34 constitute variable means of the first and second dies 25 and 26 and the mandrel 27. The driving devices 28 and the attachment plate 32 of the mandrel 27 are provided respectively with pulse oscillators 43 and 44 for detecting the locations of the first die 25, the second die 26, and the mandrel 27.

This control system further includes a control unit (control means) 46 for calculating an extrusion length and opening area of the molding corresponding to the amount of extrusion of the molding in the amount of movement of the ram 23 in accordance with control data such as factors of variation of the extrusion length and opening area of the molding preliminarily input from a data input terminal console 45 based on a detection signal from the pulse oscillator 41 and controlling a driving fluid from the driving source 42 to move the first and second dies 25 and 26 and the mandrel 27 by controlling the driving fluid from the driving source 42. The location information of the first and second dies 25 and 26 and the mandrel 27 detected by the pulse oscillators 43 and 44 is fed back to the control unit 46.

One embodiment of a variable section extrusion molding method according to the present invention which uses an extrusion molding apparatus thus constructed will now be described with reference to FIGS. 1 through 5.

Figure 3:
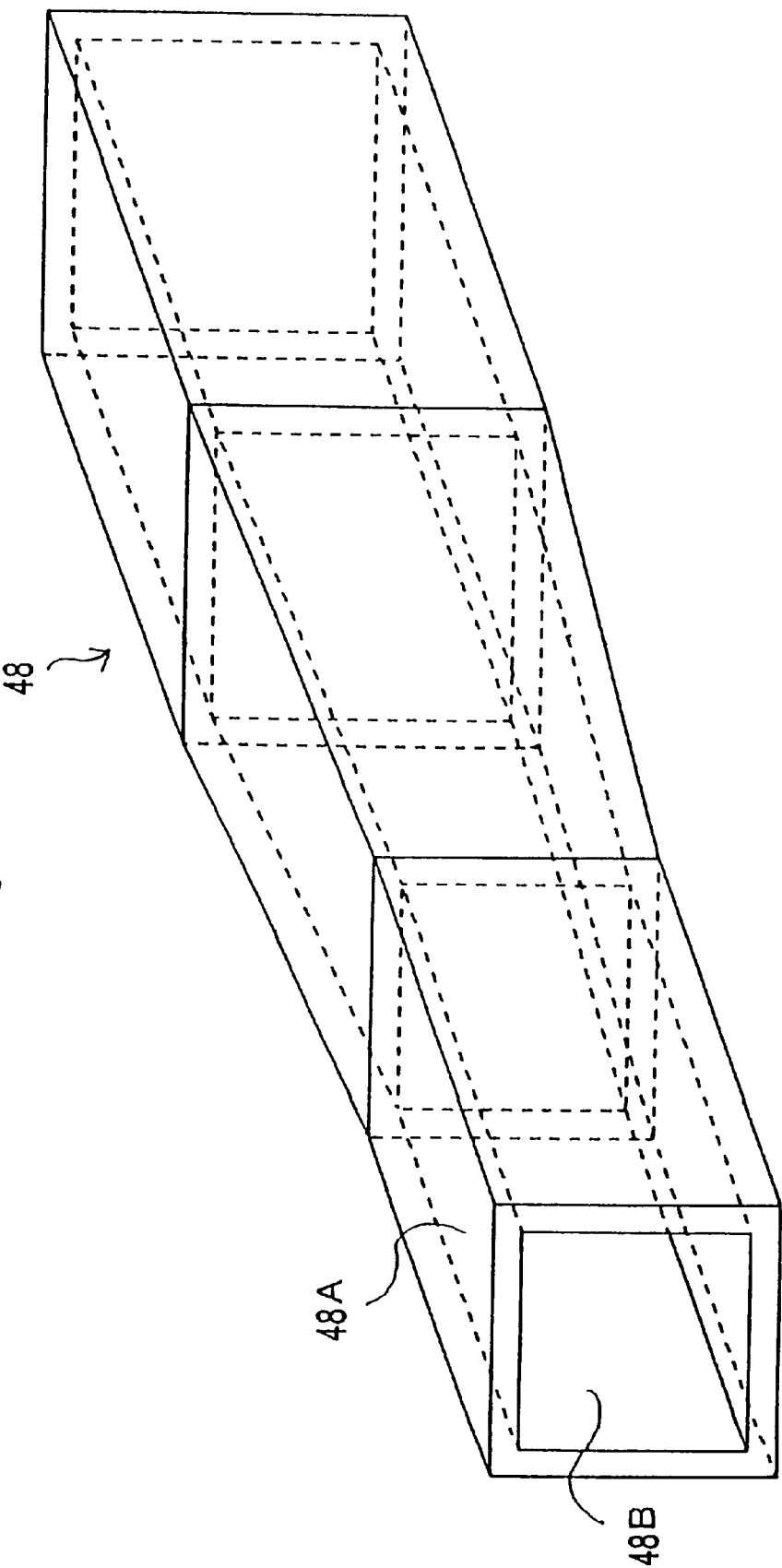
FIG. 3 is a perspective view of a tubular molding molded by the variable section extrusion die set.
Figure 4:
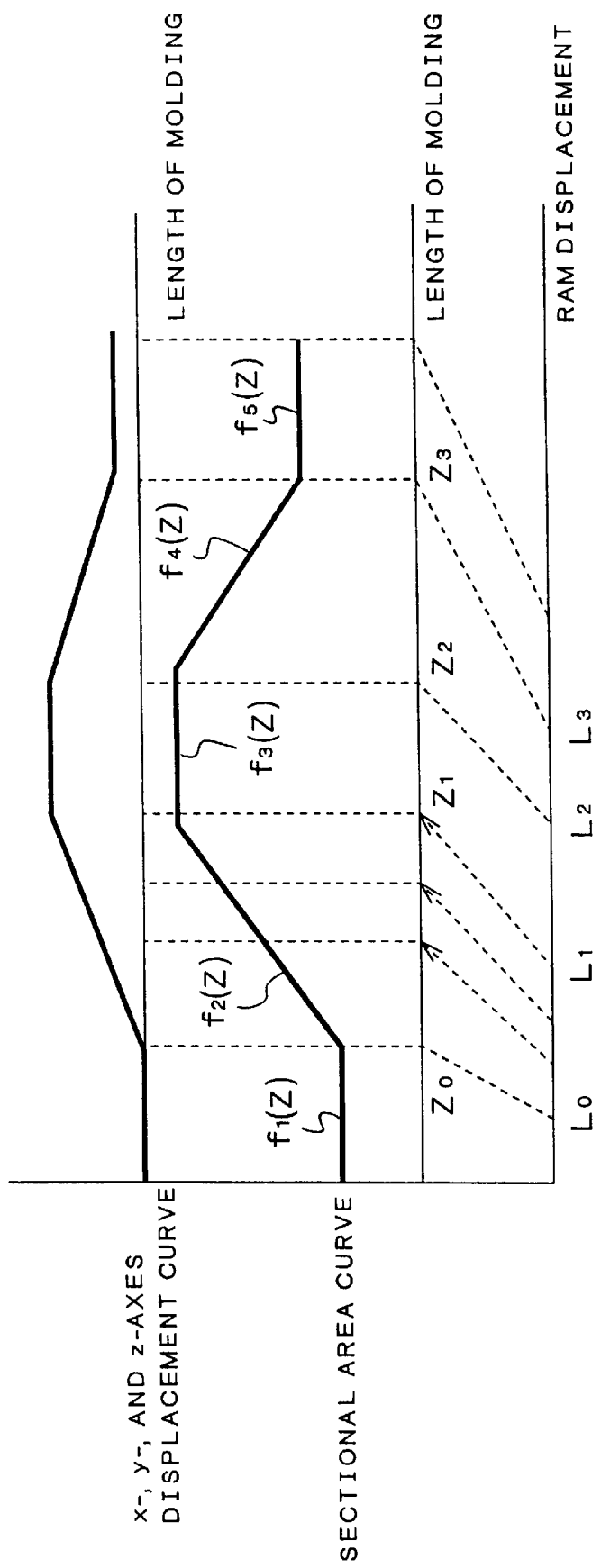
FIG. 4 is a graph showing a relationship between the length and the area of the tubular molding molded by the extrusion molding apparatus.
Figure 5:
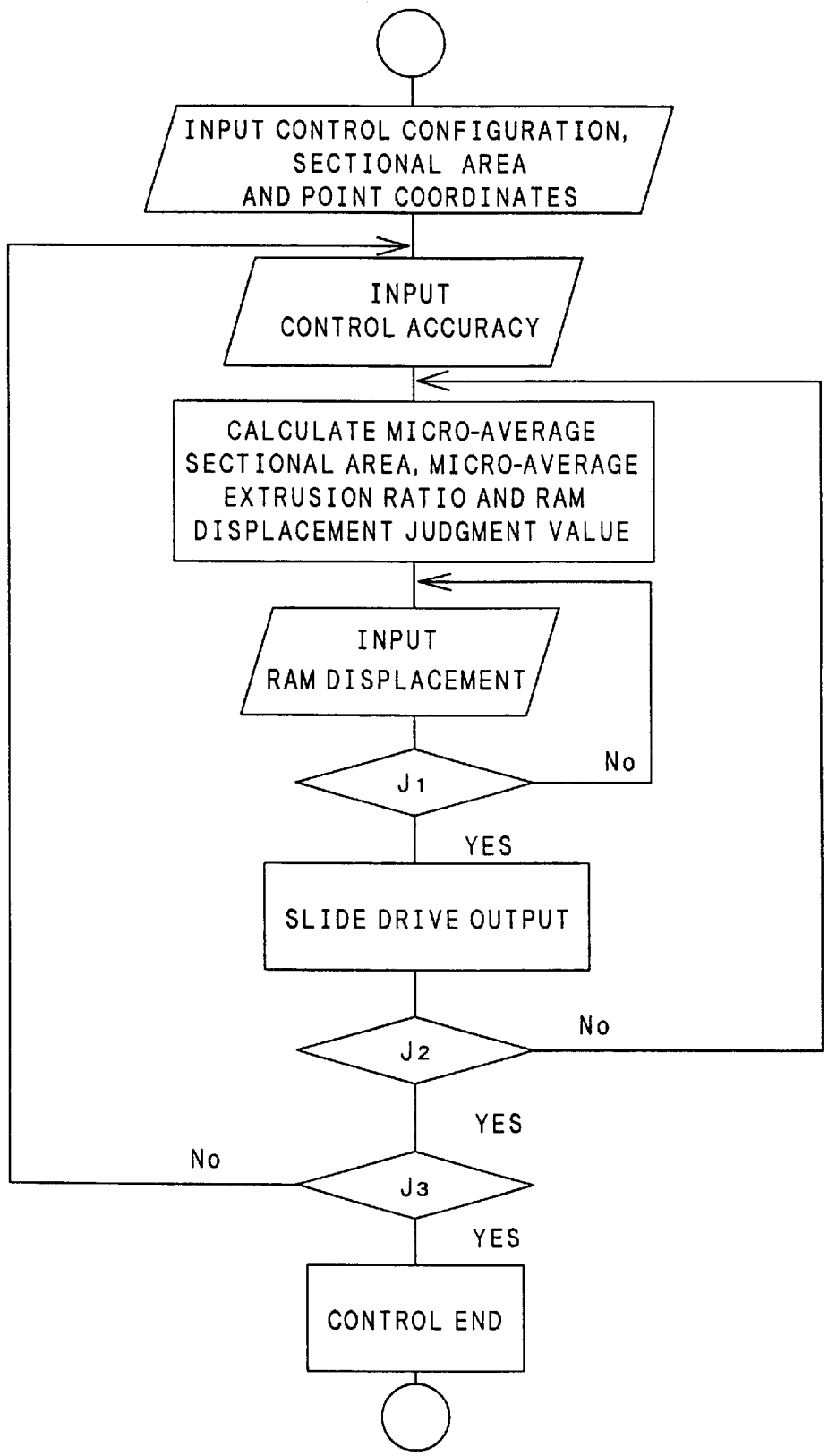
FIG. 5 is a flow chart showing one embodiment of a variable section extrusion molding method according to the present invention.

FIG. 4 shows curves of a sectional area in the length direction of a rectangular tubular molding (structural member) 48 to be molded using the control system of FIG. 3; in other words, the figure shows a variation of the opening area of the extrusion molding hole, and of displacement in the X-axis, Y-axis, and Z-axis directions of variation of the first die 25, the second die 26, and the mandrel 27 corresponding to the variation of the opening area. In this regard, the molding 48 shown in FIG. 3 shows a configuration of a first-half of the member molded in accordance with the displacement curve of FIG. 4.

In FIG. 4, this molding 48 is constant in outer configurational dimension and inner configurational dimension as expressed by $A=f_1(Z)$ up to $Z_0$ in the longitudinal direction shown by the abscissa of FIG. 4, and then gradually increases at a constant rate of $A=f_2(Z)$ from $Z_0$ to $Z_1$. Then, $A=f_3(Z)$ becomes constant from $Z_1$ to $Z_2$ and it is then reduced at a constant rate of $A=f_4(Z)$ from $Z_2$ to $Z_3$. Thereafter, it remains constant again as expressed by $A=f_5(Z)$.

For molding the molding 48 of such a configuration, first, the driving device 34 causes the mandrel 27 to move upwardly to retract from the container 20, and a hollow cylindrical or circular columnar billet made of aluminum, which is preliminarily heated to a predetermined temperature, is received in the billet receiving hole 21 of the container 20. Then, the driving device 34 is actuated by the hydraulic device 40 to cause the mandrel 27 to pierce into the central hole portion of the hollow cylindrical billet or the circular column-like billet is blanked at its central portion, so that the tapered portion 27B is located within the extrusion molding hole 31 between the first and second dies 25 and 26.

On the other hand, the control configuration such as inclination of $A=f_1(Z)$ to $A=f_5(Z)$ and a cutting piece, coordinates of $Z_0$ to $Z_4$, data of the displacement curve in the X-axis, Y-axis, and Z-axis of the first and second dies 25 and 26 and the mandrel 27, and a sectional area D of the container, etc., are preliminarily input into the control unit 26 through terminal console 45. Then, data of control accuracy is input. Based on these data, values of judgment with respect to a micro-average sectional area, a micro-average extrusion ratio (D/A), and displacement of the ram 23 are calculated in the control unit 46.

Subsequently, the ram 23 is actuated to cause the hollow stem 22 to press the billet in the container 20 downwardly so that a configuration corresponding to $A=f_1(Z)$ is extruded between the extrusion molding hole 31 and the mandrel 27. Then, the amount of movement of the ram 23 is gradually input into the control unit 46 from the pulse oscillator 41. When this input value $L_0$ comes to be coincident with the calculated value $L_0$ at $J_1$ of FIG. 5, the driving devices 28 and 34 are driven by the driving source 42, and then the first die 25, the second die 26, and the mandrel 27 are moved by a distance corresponding respectively to the values of the displacement curves calculated based on $A=f_2(Z)$. In this way, since the opening between the plate-like members 29 and 30 of the first and second dies 25 and 26 is gradually widened, the dimension of the square extrusion molding hole 31 is gradually enlarged. In line with the foregoing, the pyramidal tapered portion 27B of the mandrel 27 is gradually progressed in the extrusion direction. At this time, this amount of movement is feed-back controlled by detection signals coming respectively from the pulse oscillators 43 and 44. The above micro-movement control is made repeatedly. When the ram 23 reaches a point of inflection $L_1$ corresponding to $Z_1$ at $J_2$ of FIG. 5, the configuration control is started with respect to the constant sectional portion of $A=f_3(Z)$ up to $L_2$ corresponding to $Z_2$, again.

In this way, when the configuration control is completed with respect to each sectional portion of $A=f_3(Z)$, $A=f_4(Z)$, and $A=f_5(Z)$ one after another, the end of the configuration control is judged at $J_3$ and a sequence of controlling procedures is completed. As a result, as shown in FIG. 3, there can be obtained a rectangular tubular molding or molded member 48 having a tapered portion whose wall thickness is constant and whose square outer periphery 48A and inner periphery 48B are gradually varied in the longitudinal direction.

As mentioned hereinbefore, according to the variable section extrusion die set 24 and a variable section extrusion molding method using this die set, it becomes possible to easily extrude the rectangular tubular molded member 48 whose wall thickness is constant and whose square outer periphery 48A and inner periphery 48B are gradually varied in dimension in the longitudinal direction.

If the above extrusion molding is performed using the so-called "horizontal type" extrusion molding apparatus in which the ram 23, the hollow stem 22, the container 20, etc., are arranged in order in the horizontal direction and the billet within the container 20 is pressed in the horizontal direction, it is necessary in view of the construction of the extrusion molding apparatus that the outer peripheral portions of the container 10 and a die holder for holding the variable section extrusion die 24 from thereunder by some support means. For this reason, the support means is liable to interfere with the first die 25 or the second die 26. This makes it difficult to attach the first and second dies 25 and 26 to the die holder such that the first and second dies 25 and 26 can move in four directions orthogonal to each other. As a consequence, the installation locations of the first and second dies 25 and 26 are limited and the configuration of a molding to be manufactured is limited. In this respect, in the above-mentioned extrusion molding method, since the extrusion molding is performed by the vertical extrusion molding apparatus, the variable section extrusion die set 24 can be supported in its horizontal posture by a die bed below which the variable section extrusion die set 24 is installed. Since no support means liable to interfere with the variable section extrusion die set is located on the outer periphery of the die set, the first and second dies can be installed at any arbitrarily selected location. Thus, the degree of freedom for manufacturing a molding can be extensively increased.

Moreover, if the molding material is extruded in the horizontal direction, it is necessary that the outgoing molding is supported by a roller or the like from under. This results in a possibility that a lower surface of the molding may be damaged. In addition, according to the above molding method, since a rectangular tubular member whose outer configurational dimension varies in the longitudinal direction is molded, the level of the lower surface is changed to make it difficult to support the rectangular tubular member. Furthermore, since the end platen to which the first and second dies 25 and 26 are secured is inclined, and as a result the first and second dies 25 and 26 and the driving device 28 are inclined relative to each other, the line of force between the driving device 28 and the first and second dies 25 and 26 is offset to necessitate an excessively large sliding force. In the worst case, the apparatus is damaged. In this respect, according to the above extrusion method, the first and second dies 25 and 26 and the driving device 28 can be installed on the same end platen. Accordingly, no relative inclination is produced between the variable section extrusion die set 24 and the driving device 28. Thus, a molding can be extrusion molded with a small sliding force and with high accuracy. Moreover, since the molding can be extruded without contacting a guide or a table, the problem of causing damage to the outer peripheral surfaces of the molding can be obviated. In addition, since a vertical-type molding apparatus is used, the extrusion molding can be performed in a space-efficient manner.

Also, the control means in the above extrusion molding method may employ, as the location detector means, an ordinary speed measuring pulse oscillator, an optical sensor, or the like. It may also employ, as the control means, an arithmetic calculation processor such as a small personal computer or the like. Accordingly, with only minor additional equipment added to the existing extrusion molding device and without making extensive changes and modifications to the conventional extrusion molding device, the above control can be performed.

In the above embodiment, by enlarging the opening portions between the plate-like members 29 and 30 of the first and second dies 25 and 26, the dimension of the square-shaped extrusion molding hole 31 is gradually increased. Also, by gradually moving the pyramidal tapered portion 27B of the mandrel 27 forwardly in the extrusion direction in line with the foregoing, the rectangular tubular molding 48 having a constant wall thickness and a tapered portion as shown in FIG. 3 is extruded. It should be noted, however, that the present invention is not limited to this. According to the above variable section extrusion die set 24, other various molding methods can be employed in which by moving only the mandrel 27 with the locations of the plate-like members 29 and 30 fixedly maintained, the outer peripheral configuration of the molding is kept constant and only its wall thickness is varied so that the strength of the molding is varied in the longitudinal direction. Alternatively, by bringing only the plate-like members 29 and 30 toward and away from each other with the mandrel 27 fixedly maintained, the internal configuration of the molding is kept constant and only its outer peripheral configuration is gradually increased, so that the strength of the molding is varied in the longitudinal direction.

Furthermore, it is also possible that only one of the plate-like members 29 and 30 of the first and second dies is enlarged or reduced, so that the outer peripheral configuration of the extrusion molding hole 21 is partially formed in a rectangular shape. It is also acceptable that by reciprocally bringing the mandrel 27 into and out of the extrusion molding hole 31, a molding having a hollow interior portion, a solid interior portion an a hollow interior portion, all arranged in this order in the longitudinal direction, is extruded.

In this way, when such a molded member as mentioned above is used as a component member of automobiles or the like, there can be manufactured a component member having both optimal outer peripheral configuration and optimal strength at each location in the longitudinal direction by varying the configuration and dimension of the outer periphery or by varying only the wall thickness while maintaining the configuration and shape thereof based on an arrangement circumference of the peripheral environment under which the component member is attached.

Embodiment 2

Figure 6:
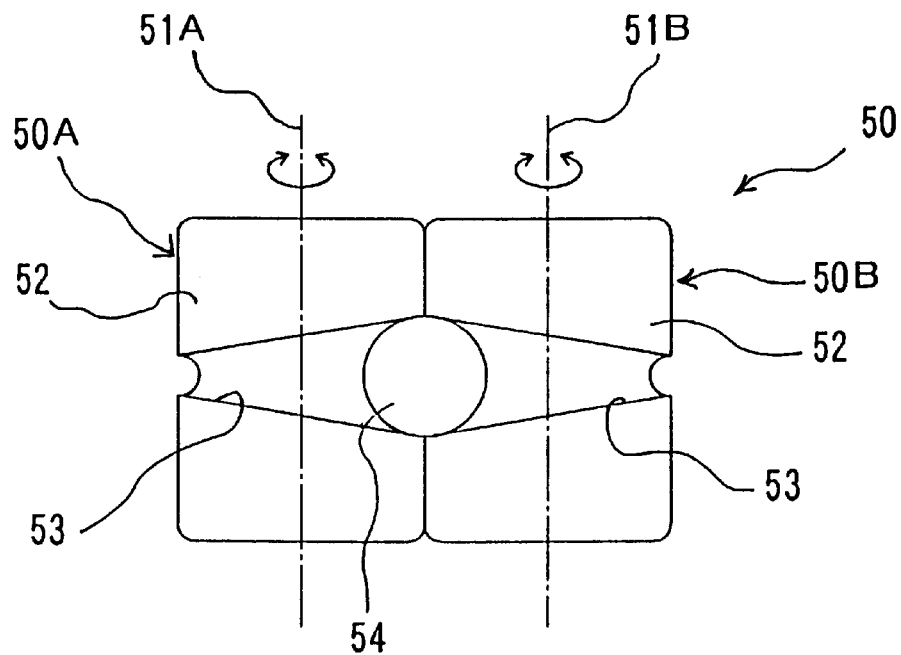
FIG. 6 is a plan view showing the second embodiment of a variable section extrusion die set according to the present invention.
Figure 7:
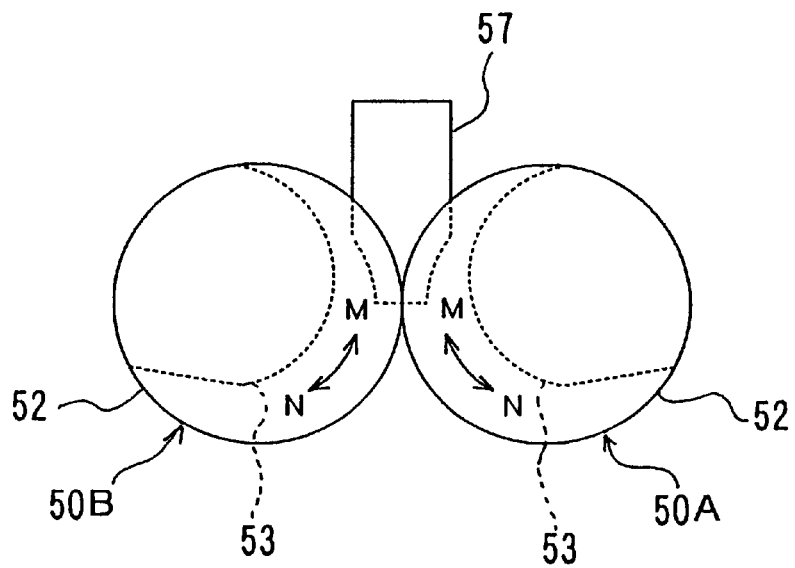
FIG. 7 is a side view of FIG. 6.

FIGS. 6 and 7 show the second embodiment of a variable section extrusion die set according to the present invention; FIG. 6 is a plan view and FIG. 7 is a side view thereof.

This variable section extrusion die set 50 comprises a pair of first and second circular columnar dies 50A and 50B having the same diameter, and a mandrel 57. Here, the first and second dies 50A and 50B are located such that their center axes 51A and 51B are in parallel relation. With an outer peripheral surface (arcuate surface) held in contact, the first and second dies 50A and 50B are rotatable respectively about the center axes 51A and 51B. A semi-circular groove portion 53 extending in the circumferential direction and whose radius continuously varies in the circumferential direction is formed in the outer peripheral surface 52 of each die 50A and 50B. The groove portions 53 of the dies 50A and 50B are entirely the same in configuration and symmetrical with each other. The groove portions 53 of the dies 50A and 50B are combined together with the same sectional portions (those portions having the same radius) held in opposing relation. In addition, both the semi-circular grooves 53 and 53 in combination constitute an extrusion molding hole 54 having a circular configuration (closed sectional form). The first and second dies 50A and 50B are associated with each other such that they can rotate in opposite directions in synchrony. That is, when one of the dies, for example, the first die 50A, is rotated in a direction as indicated by an arrow M, the other die, that is, the second die 50B is also rotated in a direction as indicated by the other arrow M; and in contrast, when the first die 50A is rotated in a direction as indicated by an arrow N, the second die 50B is also rotated in a direction as indicated by the other arrow N.

If the extrusion molding is performed using this variable section extrusion die set 50, a molding material is extruded towards the circular extrusion molding hole 54 which is formed by a combination of the groove portions 53 and 53 of the first and second dies 50A and 50B. By doing this, a rod-like molding having a circular cross section can be produced. At this time, the radius of the extrusion molding hole 54 can be varied by rotating the first and second dies 50A and 50B in opposite directions in synchrony to vary the locations of the opposing groove portions 53 and 53. Accordingly, while causing the molding material to flow by pressing thereof, the first and second dies 50A and 50B are rotated to vary the diameter of the extrusion molding hole 54 midway in the flowing operation of the molding material so that a molding whose diameter varies in the longitudinal direction can be produced. In line with the foregoing, the mandrel 57 is inserted into the extrusion molding hole 54 to extrude the molding material through a gap between the mandrel 57 and the extrusion molding hole 54.

Figure 8:
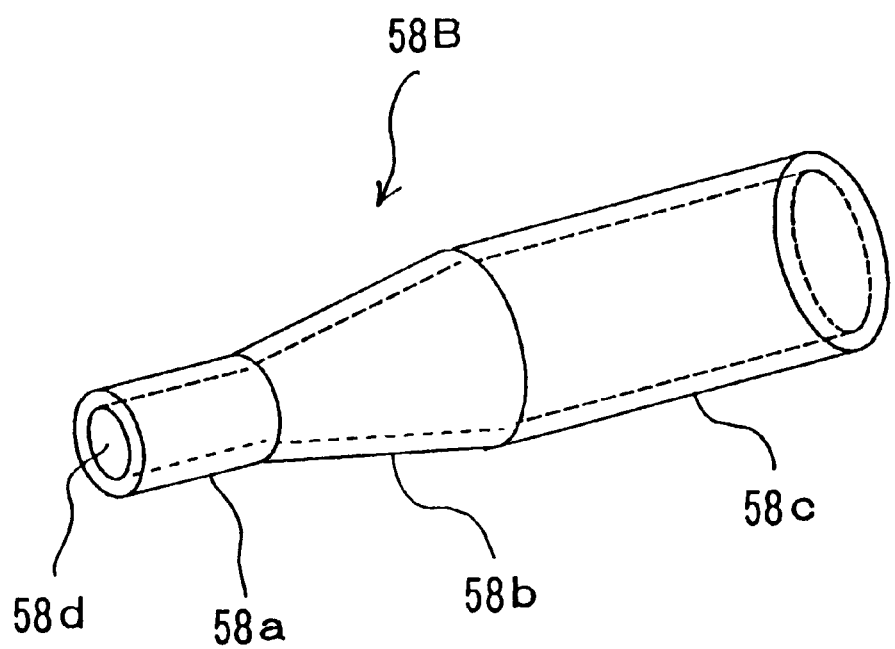
FIG. 8 is a perspective view showing a configuration of a circularly tubular molding molded by the die set.
Figure 9:
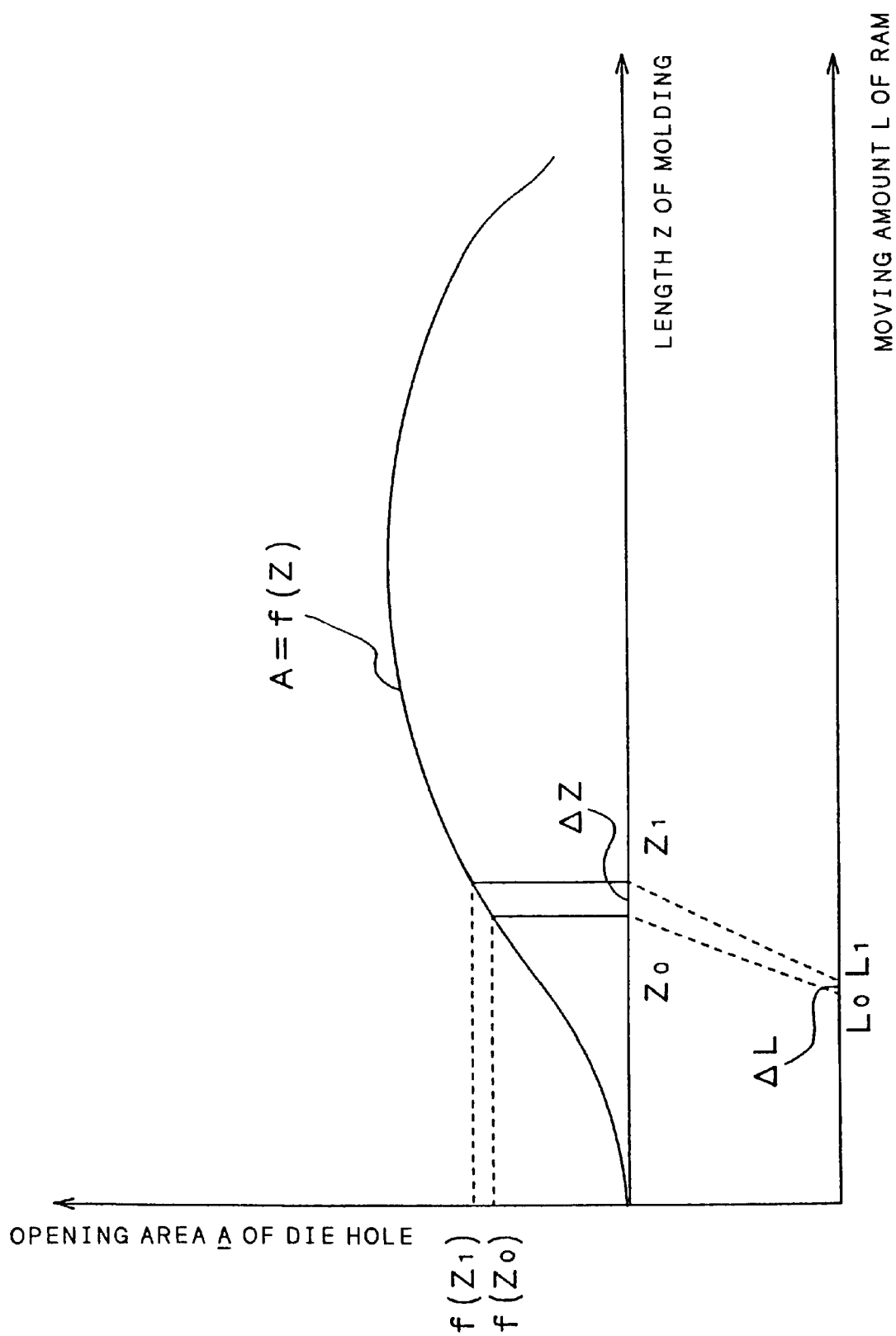
FIG. 9 is a graph for explaining the principles of the variable section extrusion molding method according to the present invention.
Figure 10:
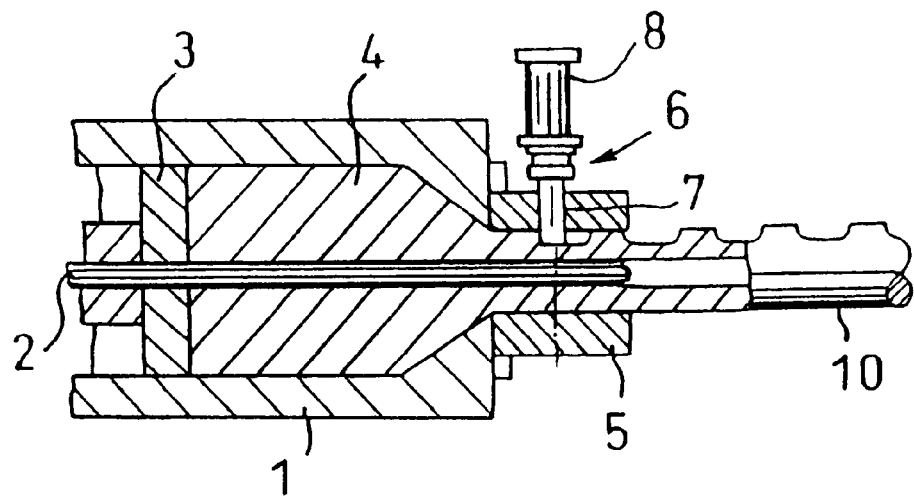
FIG. 10 is a vertical sectional view showing a conventional variable section extrusion die set.
Figure 11:
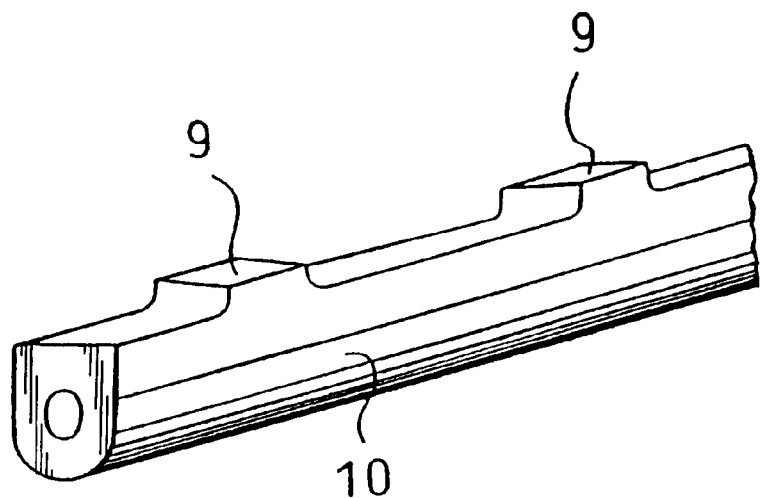
FIG. 11 is a perspective view showing the configuration of a molding molded by the variable section extrusion die set of FIG. 10.

FIG. 8 shows one example of a molded member 58 thus obtained. A reduced diameter portion 58a is formed by defining the extrusion molding hole 54 at the location of the groove portion 53 having a reduced radius. Then, a tapered portion 58b is formed by enlarging the diameter of the extrusion molding hole by rotating the first and second dies 50A and 50B. Similarly, an enlarged diameter portion 58c is formed by defining the extrusion molding hole 54 at the location of the groove portion 53 having an enlarged radius. Furthermore, by varying the inserting position of the mandrel 57 having a tapered distal end, the diameter of an inner hole 58d can also be varied in the longitudinal direction.

In this way, during the process of extrusion molding, the first and second dies 50A and 50B are rotated to vary the diameter of the extrusion molding hole 54 and the extrusion molding is continued while reciprocally moving the mandrel 57. By doing this, a hollow molded member 58B whose outer diameter varies in the longitudinal direction and whose inner hole 58d also varies in diameter can be obtained as shown in FIG. 8.

In the case in which this variable section extrusion die set 50 is employed, since it is just sufficient to provide a mechanism for rotating the dies 50A and 50B as a molding apparatus, the construction is simplified and the entire apparatus becomes compact. Furthermore, since the dies 50A and 50B are constituted of a circular columnar member, the groove 53 can be formed over the entire periphery. This makes it possible to form the length of the groove portion 53 sufficiently large and to greatly vary the sectional form of the groove portion 53.

In the above embodiment, a circular columnar member is used as the dies 50A and 50B. It should be noted, however, that the present invention is not limited to this. A cylindrical member can be used in place of the circular columnar member. It is also acceptable that an arcuate surface is formed on a part of the die set so that it can be used as the circular columnar member. The sectional configuration of the groove portion 53 is not limited to the semi-circular shape but may arbitrarily be selected from any desired shape.

As described hereinbefore, in a variable section extrusion die set and a variable section extrusion molding method according to the present invention, when a molding material such as aluminum is extrusion molded, a tubular member whose outer configurational dimension and inner configurational dimension are easily variable in the longitudinal direction can be produced. Accordingly, it can suitably be used when a variable section tubular member is used as various component members such as chassis members, vehicle main-frame members, bumper members, etc., in various types of automotive vehicles such as ordinary automobiles, trucks and the like.

We claim:

1. A variable section extrusion die set comprising: a moveable ram, a die set having a first die displaceable in a first direction orthogonal to an extrusion direction of a molding material and a second die displaceable in a second direction orthogonal to the extrusion direction and perpendicular to the first direction and wherein said die set being adapted to vary an area of an extrusion molding hole by displacing the die set in the first and second directions through which molding material is extruded by movement of said ram; a mandrel reciprocally movable in and out of said extrusion molding hole in the extrusion direction and provided on an outer peripheral portion thereof with a tapered portion which is gradually reduced in an outer configurational dimension from one direction of the reciprocally moving direction to the other direction toward an exit of the molding hole; and control means for controlling said movement of said ram, said displacing of said die set, and said reciprocal movement of said mandrel during extrusion; wherein said mandrel is positioned to move into said extrusion molding hole from a position upstream of said extrusion molding hole and is reciprocally movable in and out of said extrusion molding hole independently of said ram and said die set, while said ram extrudes the molding material through said extrusion molding hole, and wherein displacement of the first die in the first direction and displacement of the second die in the second direction are independent of each other, said ram and said mandrel.

2. A variable section extrusion die set according to claim 1, wherein said first die having an opening portion which is expansible and contractible in the first direction, and said second die located on a downstream side of said first die in the extrusion direction, said second die having an opening portion which is expansible and contractible in the second direction, said mandrel being located within an extrusion molding hole defined by an overlapped portion of the opening portions of said first and second dies such that said mandrel can reciprocally move in the extrusion direction.

3. A variable section extrusion die set according to claim 2, wherein said first die comprises a pair of plate members having parallel opposing surfaces that can be brought toward and away from each other, said second die comprises another pair of plate members having parallel opposing surfaces that can be brought toward and away from a direction orthogonal to said first die, and said mandrel has a prismatic configuration similar to a square extrusion molding hole defined by the overlapped portion of the opening portions of said first and second dies, said mandrel being provided on an outer peripheral portion thereof with a tapered portion wherein side surface dimensions are gradually reduced from one direction of the reciprocally moving direction to the other direction.

4. A variable section extrusion molding method using a movable ram, control means, a variable section extrusion die set comprising a die set having a first die displaceable in a first direction orthogonal to an extrusion direction of a molding material and a second die displaceable in a second direction perpendicular to the first direction, said die set adapted to vary an area of an extrusion molding hole by displacing the die set in the first and second directions through which the molding material is extruded by movement of said ram, and a mandrel reciprocally movable in and out of said extrusion molding hole in the extrusion direction and provided on an outer peripheral portion thereof with a tapered portion which is gradually reduced in outer configurational dimension from one direction of the reciprocally moving direction to the other direction toward an exit of the molding hole, wherein said mandrel is positioned to move into said extrusion molding hole from a position upstream of said extrusion molding hole and is independently movable of said ram and said die set, and wherein said first and second dies are independently moveable of each other, said ram and said mandrel, the method comprising the steps of: moving said die set to change the area of the extrusion molding hole while pressing the molding material against said die set by moving said ram; reciprocally moving the tapered portion of said mandrel in and out of the extrusion molding hole while pressing the molding material against said die set by ram; and controlling with said control means said steps of moving said die set, pressing said molding material, and reciprocally moving said mandrel, thereby extrusion molding a tubular molding which varies in outer configurational dimension and inner configurational dimension in a longitudinal direction along the tubular molding in response to the movement of said die set, said ram, and reciprocal movement of the mandrel, respectively, wherein said step of moving said die set includes moving said first die of said die set and moving said second die of said die set independently of each other.

5. A variable section extrusion molding method according to claim 4, wherein said first die having an opening portion which is expansible and contractible in the first direction, and said second die located on a downstream side of said first die in the extrusion direction, said second die having an opening portion which is expansible and contractible in the second direction, said mandrel being located within said extrusion molding hole defined by an overlapped portion of the opening portions of said first and second dies such that said mandrel reciprocally moves in the extrusion direction, further comprising the steps of: moving opposing surfaces of said first and second dies toward and away from each other to change the area of a square extrusion molding hole while pressing the molding material against said first and second dies; and reciprocally moving the tapered portion of said mandrel within the extrusion molding hole in the extrusion direction, thereby extrusion molding a rectangular tubular molding whose square outer and inner peripheries vary in the longitudinal direction along the tubular molding.

6. A variable section extrusion molding method according to claim 4, wherein a factor of variation of the opening area of said extrusion molding hole versus a length dimension of said ram and an extrusion amount of the molding material are preliminarily set by said control means, said die set and mandrel being driven to control the amount of variation of the opening area by said control means while detecting the amount of movement of said ram during extrusion, such that said tubular molding will have an extrusion length and cross sectional area corresponding to the amount of movement of said ram, said die set, and said mandrel.

7. A variable section extrusion molding method according to claim 4, wherein the molding material is extruded from above the extrusion molding hole formed by said die set.

* * * * *